May 19, 1959     E. F. RATHGEBER     2,887,136

ROUTER BIT

Filed Sept. 19, 1957

INVENTOR.
Eric F. Rathgeber
BY
John J. Sullivan
ATTORNEY..

United States Patent Office 2,887,136
Patented May 19, 1959

2,887,136
ROUTER BIT

Eric F. Rathgeber, Farmingdale, N.Y., assignor to Republic Aviation Corporation, Farmingdale, N.Y., a corporation of Delaware Application September 19, 1957, Serial No. 684,893

5 Claims. (Cl. 144—219)

This invention relates to cutting tools or routers and more particularly to an improved router bit so formed and designed that the applied force required for its operation and the heat generated during its operation is considerably less than that incidental to and attending existing router bits.

The present invention contemplates a router bit having double-spiral flutes so formed that one of the cutting edges defined thereby tapers or converges towards the other cutting edge from shank to point or nib to thereby create a relatively large initial clearance for the swarf or shavings which clearance gradually lessens as the bit penetrates the work material.

Additionally, the point of the instant router bit is located radially outward of the longitudinal axis of the router whereby it rotates in a relatively large circle about said axis as it cuts its way into and through the work material.

Heretofore, double-flute router bits have been employed which terminate in a point located substantially at the transverse center to be disposed on the longitudinal axis of the bit. Upon the initial drilling operation of the bit into and through the workpiece, the point of these prior bits rotates in a fixed position and the shavings or swarf pass upwardly and out through the flutes until penetration of the bit through the workpiece is completed. Constant rotation of the bit during this operation produces substantial frictional heat which tends to weaken and considerably foreshorten the life of the bit. Moreover, if, for any reason, the bit is caused to bind, as for example when the shavings are not removed fast enough, the frictional heat reaches an intensity sufficient to break the bit.

These prior bits, in addition, employ cutting edges which are disposed equal distances from the longitudinal axis of the router. Clearance, therefore, for the passage and removal of shavings is limited to the spaces or grooves defined by the helical or spiral flutes to thereby promote binding of the bit, especially when rotating at high velocity. Such limited clearance also hinders or restricts the free flow of coolants completely around and over the bit and through the aperture being made in the workpiece.

The foregoing adverse conditions also prevail after the initial drilling operation has been completed and the bit is moved laterally or lineally of the workpiece during the routing operation. This results in relatively slow cutting progress and an application of considerable force by the operator on and against the router. This required force plus the frictional heat generated during the slow advance by the bit through the workpiece makes routers notoriously short-lived even under the best of operating conditions.

The present invention proposes to overcome the above as well as other objections and shortcomings of router bits. To that end, it is proposed to so modify or rework the conventional router bit that additional clearance between the rotating bit and workpiece for escape and removal of the shavings is provided. It is further proposed to so relocate the point or nib of the bit that it is not confined to a single point of contact on and against the workpiece during the initial drilling operation.

More specifically, following the teachings of this invention, one cutting edge of the router bit is gradually tapered from substantially the point to the shank thereof and the teeth (i.e. the raised surfaces of the bit between the flutes) adjacent the cutting edges are rounded or curved from the longitudinal axis outwardly to become convex. The spaces defined by the opposed flutes are thereby enlarged and the total effective clearance between workpiece and bit is substantially increased. Also, the area of contact between bit and workpiece, i.e. between the outer surfaces of the teeth and the surface of the workpiece defining the hole or slot being cut therein, is materially reduced with an attendant reduction in frictional heat generated in the operation of the router.

At the same time, the nib of the bit is cut angularly and rearwardly from the unaltered cutting edge to substantially the longitudinal axis of the bit to thereby locate the point thereof adjacent the unaltered cutting edge which makes it eccentric relative to the bit. During the drilling operation of the router, therefore, the point of the bit is rotated in a circle about the longitudinal axis of the bit whereby it contacts and operates against a relatively large surface of the workpiece as opposed to the fixed contact point of the conventional or prior bit.

Rotation of the router during its entire operation is such that the tapered cutting edge precedes the unaltered cutting edge. Thus, drilling and/or routing of the workpiece is accomplished in two steps, viz., the tapered cutting edge removes or shaves a portion of material from the workpiece and the ensuing cutting edge removes the balance of such material to produce the ultimate or desired cut. This two-step operation is distinguished from the single step of prior double-flute routers. While the size or thickness of the shavings of the tapered cutting edge is smaller than that of the conventional router, the shavings of the unaltered cutting edge are considerably larger due to the additional clearance and virtual elimination of friction and binding. Consequently, the bit moves easier and quicker through the workpiece and the heat problem normally incidental to routing operations and responsible for breakdown and failure of the router is avoided.

It has been learned through tests and experiments that router bits manufactured in accordance with the teachings of this invention are generally capable of continued use until their cutting edges have dulled. Heretofore, routers have not usually required re-sharpening for further use nor have they been discarded because of dullness. Invariably, these prior routers break long before their cutting edges are gone.

With the above and other objects in view, as will be apparent, this invention consists in the construction, combination and arrangement of parts all as hereinafter more fully described, claimed and illustrated in the accompanying drawings wherein:

Figure 1A:
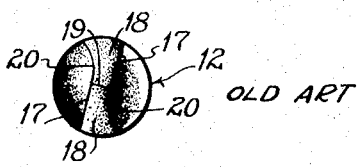
Fig. 1A is a similar view of a conventional double-spiral flute router bit heretofore employed.

Referring now to Figs. 1A to 3A of the drawings, 10 designates a conventional router comprising a shank 11 and a bit 12. The bit is formed by a pair of diametrically opposed twist or spiral grooves 13 extending longitudinally thereof and separated by uncut portions or teeth 14. Diametrically opposed edges of the teeth 14 defining the grooves or flutes 13 constitute cutting edges 15 of the bit 12. At the outer end of the bit, teeth 14 terminate in relatively flat surfaces or lands 18 which join at substantially the longitudinal axis of the router to form a point 19. The respective edges of the lands 18 contiguous with and extending from the cutting edges 15 extend substantailly from the longitudinal center of the router outwardly to define the concave surfaces of the flutes 13. These edges are sharpened and constitute the cutting lips 20 of the router. The opposite edges 17 of the lands 18 are substantially straight (Fig. 1A).

The present invention proposes to so modify the above described router, so that additional clearance between the router bit and the workpiece is obtained and at the same time friction incidental to operation of the bit is materially reduced. The result of such modification is the elimination of any possible binding of the bit in the workpiece during operation and a substantial reduction in frictional heat generated thereby.

Figure 1:
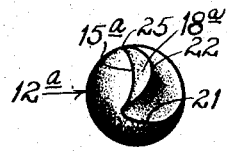
Fig. 1 is a plan view of the nib of the present router bit to show the asymmetrical cutting edges and lips thereof and the surfaces of the teeth adjacent these cutting edges and lips relieved or cut back convexly from the longitudinal axis of the bit outward.
Figure 2A:
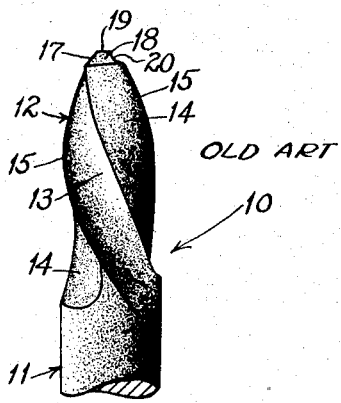
Fig. 2A is a view like Fig. 2 of the router bit shown in Fig. 1A.
Figure 2:
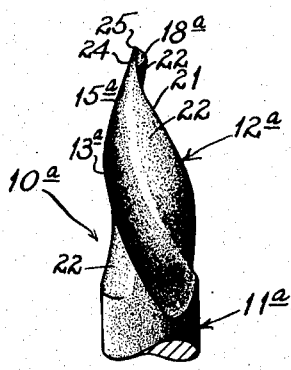
Fig. 2 is a side view, partly in section, of the router bit illustrated in Fig. 1 to show the tapered cutting edge contemplated by the subject invention.
Figure 3A:
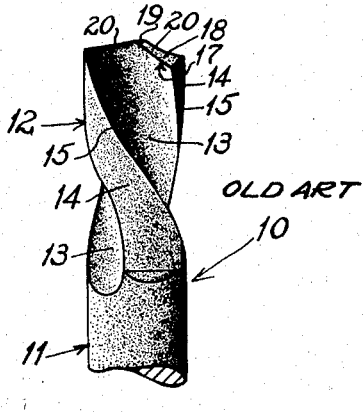
Fig. 3A is a view like Fig. 3 of the conventional router bit.
Figure 3:
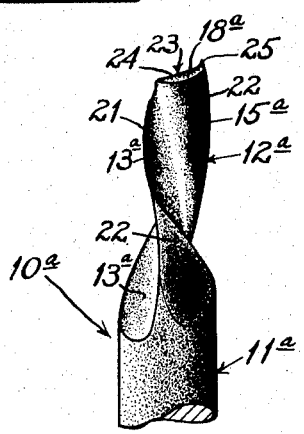
Fig. 3 is a view of the router bit shown in Fig. 2 when rotated 90°.

To the above ends, it is proposed (Figs. 1, 2 and 3, wherein the suffix "a" is employed after the reference characters to designate corresponding parts illustrated in Figs. 1A, 2A and 3A) that one of the cutting edges be foreshortened and removed gradually from shank 11a to the outer end of the bit 12a including the associated lip 20 and land 18 to thereby form a tapered cutting edge 21. In addition, the edges 17 including their longitudinal continuations defining the flutes 13 are each removed from the longitudinal axis of the router outwardly to thereby form curved or arcuate, convex surfaces 22a as best shown in Fig. 1. The outer end of bit 12a is removed by an angular cut as at 23 (Fig. 3) extending from the tapered cutting edge 21 outwardly to the opposed unaltered cutting edge 15a to create a single land 18a terminating at one edge in a single cutting lip 24. In addition, this cut 23 is on the bias, i.e. less than 90° relative to the longitudinal axis of the router, to give the land 18a the desired rake or angularity. Hence, point 19 is removed and a new point 25 is established at the end of the land 18a to be thereby disposed as remotely as possible from the longitudinal axis of the router.

Operation of the present router should now be readily understood. Initial drilling of the workpiece is accomplished by contact of point 25 with the work surface whereupon rotation of the router with relatively little pressure applied thereon forces the point inwardly of the material. The cutting lip 24 gouges the surface of the workpiece and the tapered cutting edge 21 shaves the gouged material from the workpiece and passes it upwardly and out through the associated groove or flute 13a. Continued rotation of the router brings the unaltered cutting edge 15a of the bit 12a into contact with the workpiece, taking a second bite or cut of the material thereof adjacent that just removed by the tapered cutting edge 21.

When the drilling operation is completed and routing of the workpiece is commenced by lineal movement of the router relative to the workpiece, the two-bite operation of the router bit continues. In this operation, as opposed to the drilling operation where a continuous shaving is removed from the workpiece, the swarf or chips are ejected downwardly as well as upwardly of the workpiece. Moreover, this ejection is facilitated by the space or slot aft of the router where the material of the workpiece has just been removed.

The additional clearance and reduction in friction between workpiece and bit obtained by the modified construction of the conventional double-flute router hereinabove described, nevertheless, facilitates the routing operation. The router is thus pushed or moved upon application of relatively little force exerted by the operator more rapidly through and along the workpiece following a given template or guide in the customary practice. In so moving, the heat generated is substantially less than that encountered with prior routers and the structural integrity of the router herein proposed is virtually unaffected thereby.

While the instant invention has been, for convenience, described and illustrated in terms of modifying or reworking a conventional double-spiral flute router bit, it is understood that the invention also contemplates manufacture of the proposed router bit in its final form.

Also, the drilling and routing operations have been described in connection with a single workpiece whereas in practice multiple, stacked sheets of material are often merely routed or both drilled and routed. It is thought that, so far as the invention is concerned, the design, operation and function of the present router bit is equally effective in producing the desired results regardless of the number of sheets constituting the workpiece or whether or not it is merely routed or fist drilled and then routed.

What is claimed is:

1. A router bit formed by a pair of longitudinal spiral flutes separated one from the other by a tooth, a cutting edge at and along one side of each tooth to be disposed in substantial diametrical opposition one to the other at every point in the length of the bit, one of said cutting edges being of substantially uniform distance from the longitudinal axis of the router bit throughout its length and the other of said cutting edges being of gradually varying distances from the longitudinal axis of the router bit from the outer end of the bit inwardly, whereby to form a relatively tapered end on the bit, a convex surface provided on each tooth extending from each cutting edge and merging with the surface of the bit defining the adjacent flute substantially at the base of said flute, a blunt outer end on the bit extending obliquely therefrom and terminating in a point at said one cutting edge, a rake on said end, and a cutting lip at and along the outermost edge of said rake.

2. A router bit formed by a pair of longitudinal spiral flutes separated one from the other by a tooth, a cutting edge at and along one side of each tooth to be disposed in substantial diametrical opposition one to the other at every point in the length of the bit, one of said cutting edges being of substantially uniform distance from the longitudinal axis of the router bit throughout its length and the other of said cutting edges being of gradually varying distances from the longitudinal axis of the router bit from the outer end of the bit inwardly, whereby to form a relatively tapered end on the bit, a blunt face on the outer end of the bit extending angularly and outwardly of the bit from the end of the tapered cutting edge to the other cutting edge to thereby form an eccentric point, and a cutting lip at and along one edge of said face.

3. A router bit formed by a pair of longitudinal flutes separated one from the other by a tooth having a convex outer surface, asymmetric cutting edges at and along diametrically opposed sides of said teeth, a land on the outer end of the bit, and a point at the outer extremity of said land.

4. A router bit formed by a pair of longitudinal flutes separated one from the other by a tooth, asymmetric cutting edges at and along diametrically opposed sides of said teeth, the surfaces of said teeth being convex extending from each cutting edge and merging with the surface of the bit forming the base of the adjacent flute, and a blunt face on the outer end of the bit constituting a land having a cutting lip formed on one edge thereof and extending outwardly of the bit to terminate in an an eccentric point.

5. A double-spiral flute router bit formed by asymmetric cutting edges extending longitudinally thereof, a tooth having a convex outer surface interposed between each flute of said bit, said teeth terminating at their outer ends in a blunt face disposed at an oblique angle relative to the longitudinal axis of the bit and terminating in a point formed by the intersection of said face with the associated cutting edge, and a rake on said face.

References Cited in the file of this patent

UNITED STATES PATENTS

| | | |
|---|---|---|
| 1,789,793 | Wedhorn | Jan. 20, 1931 |
| 1,907,880 | Royle | May 9, 1933 |
| 1,963,611 | Brumell et al. | June 19, 1934 |
| 2,675,841 | Einhiple | Apr. 20, 1954 |
| 2,792,862 | Emmons | May 21, 1957 |